United States Patent
Yan et al.

(10) Patent No.: US 10,715,233 B2
(45) Date of Patent: Jul. 14, 2020

(54) SOUNDING REFERENCE SIGNAL (SRS) TRANSMIT ANTENNA SELECTION

(71) Applicant: QUALCOMM Incorporated, San Diego, CA (US)

(72) Inventors: Hongbo Yan, Vista, CA (US); Supratik Bhattacharjee, San Diego, CA (US); Gregory Foerster, San Diego, CA (US); Prashant Udupa Sripathi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/110,610

(22) Filed: Aug. 23, 2018

(65) Prior Publication Data

US 2019/0068260 A1 Feb. 28, 2019

Related U.S. Application Data

(60) Provisional application No. 62/552,786, filed on Aug. 31, 2017.

(51) Int. Cl.
*H04B 7/06* (2006.01)
*H04L 5/00* (2006.01)
(Continued)

(52) U.S. Cl.
CPC ......... *H04B 7/0608* (2013.01); *H04B 7/0404* (2013.01); *H04B 7/0691* (2013.01);
(Continued)

(58) Field of Classification Search
CPC .. H04B 7/0404; H04B 7/0608; H04B 7/0691; H04B 7/0874; H04B 7/08–0897;
(Continued)

(56) References Cited

U.S. PATENT DOCUMENTS

| 6,252,864 | B1 * | 6/2001 | Hayashi | H04B 7/0608 370/335 |
| 6,298,092 | B1 * | 10/2001 | Heath, Jr. | H01Q 1/246 375/267 |

(Continued)

FOREIGN PATENT DOCUMENTS

| JP | 2007214759 A | 8/2007 |
| WO | WO-2018052729 A2 | 3/2018 |

OTHER PUBLICATIONS

International Search Report and Written Opinion—PCT/US2018/047987—ISA/EPO—dated Nov. 16, 2018.

*Primary Examiner* — Dung B Huynh
(74) *Attorney, Agent, or Firm* — Arent Fox, LLP

(57) ABSTRACT

Methods and apparatuses relate to sounding reference signal (SRS) transmit antenna selection in wireless communication systems. For example, a user equipment (UE) may select, from a set of antennas, a subset of antennas for SRS transmission based on at least one antenna selection parameter. The UE may further transmit, on an uplink communication channel, the SRS using the subset of antennas to a network entity. In some aspects, the at least one antenna selection parameter may include a reference signal receive power (RSRP) value, a signal-to-noise ratio (SNR) value, a spectrum efficiency value, and/or an SNR value and a channel correlation value.

22 Claims, 4 Drawing Sheets

(51) Int. Cl.
*H04B 7/0404* (2017.01)
*H04B 7/08* (2006.01)
*H04L 5/14* (2006.01)
*H04L 25/02* (2006.01)

(52) U.S. Cl.
CPC ........... *H04B 7/0874* (2013.01); *H04L 5/005* (2013.01); *H04L 5/006* (2013.01); *H04L 5/0023* (2013.01); *H04L 5/0048* (2013.01); *H04L 5/1469* (2013.01); *H04L 5/001* (2013.01); *H04L 25/0226* (2013.01)

(58) Field of Classification Search
CPC ... H04L 25/0226; H04L 5/0048; H04L 5/005; H04L 5/006; H04L 25/0224–0236
See application file for complete search history.

(56) References Cited

U.S. PATENT DOCUMENTS

| | | | |
|---|---|---|---|
| 6,330,458 B1* | 12/2001 | Lamoureux | H01Q 1/246 375/334 |
| 6,804,312 B1* | 10/2004 | Win | H04B 7/0632 375/347 |
| RE40,056 E* | 2/2008 | Heath, Jr. | H01Q 1/246 375/267 |
| 7,505,788 B1* | 3/2009 | Narasimhan | H04B 7/0447 370/329 |
| 8,325,671 B2* | 12/2012 | Li | H04L 5/0037 370/330 |
| 8,467,467 B2* | 6/2013 | Lee | H04B 7/0443 375/219 |
| 8,928,541 B2* | 1/2015 | Desclos | H01Q 21/28 343/745 |
| 9,503,164 B1* | 11/2016 | Zhang | H04B 17/309 |
| 2002/0149517 A1* | 10/2002 | Iguchi | H01Q 3/24 342/374 |
| 2003/0128658 A1* | 7/2003 | Walton | H04L 1/06 370/208 |
| 2003/0157954 A1* | 8/2003 | Medvedev | H04B 7/0417 455/522 |
| 2004/0125900 A1* | 7/2004 | Liu | H04B 7/04 375/347 |
| 2005/0032521 A1* | 2/2005 | Lee | H04B 7/0626 455/450 |
| 2005/0059431 A1* | 3/2005 | Matsui | H04B 7/0814 455/562.1 |
| 2005/0124340 A1* | 6/2005 | Giesberts | H04W 48/20 455/432.1 |
| 2005/0136844 A1* | 6/2005 | Giesberts | H04L 1/0003 455/67.13 |
| 2005/0141412 A1* | 6/2005 | Sadri | H04B 7/0857 370/208 |
| 2005/0190849 A1* | 9/2005 | McNamara | H04B 7/0691 375/267 |
| 2005/0195912 A1* | 9/2005 | Kim | H04B 7/0417 375/267 |
| 2005/0250544 A1* | 11/2005 | Grant | H04B 7/0639 455/562.1 |
| 2005/0286650 A1* | 12/2005 | Han | H04B 7/0417 375/267 |
| 2006/0176993 A1* | 8/2006 | Kwun | H04B 7/061 375/367 |
| 2006/0205356 A1* | 9/2006 | Laroia | H04B 7/0811 455/66.1 |
| 2007/0002877 A1* | 1/2007 | Rada | H04L 12/5692 370/401 |
| 2007/0070927 A1* | 3/2007 | Shoki | H04B 7/0417 370/310 |
| 2007/0076582 A1* | 4/2007 | Tanaka | H04B 7/061 370/203 |
| 2007/0099584 A1* | 5/2007 | Niu | H04B 7/0608 455/101 |
| 2007/0205959 A1* | 9/2007 | Nakaya | H01Q 9/30 343/876 |
| 2007/0207837 A1* | 9/2007 | Nakaya | H04B 7/0874 455/562.1 |
| 2007/0232359 A1* | 10/2007 | Pinheiro | H04B 7/0695 455/562.1 |
| 2007/0254655 A1* | 11/2007 | Tujkovic | H04B 7/0691 455/435.1 |
| 2007/0258537 A1* | 11/2007 | Mailaender | H04B 7/063 375/267 |
| 2007/0281746 A1* | 12/2007 | Takano | H04B 7/0417 455/562.1 |
| 2008/0056406 A1* | 3/2008 | Stirling-Gallacher | H04B 7/0805 375/299 |
| 2008/0057973 A1* | 3/2008 | Park | H04L 45/125 455/452.2 |
| 2008/0063116 A1* | 3/2008 | Yokoyama | H04B 7/0632 375/299 |
| 2008/0080642 A1* | 4/2008 | Lee | H04L 1/0643 375/299 |
| 2008/0139153 A1* | 6/2008 | Tuo | H04B 7/0695 455/277.2 |
| 2008/0159426 A1* | 7/2008 | Jung | H04B 7/0634 375/260 |
| 2008/0205538 A1* | 8/2008 | Han | H04L 1/20 375/267 |
| 2008/0247330 A1* | 10/2008 | Ko | H04B 7/0617 370/252 |
| 2009/0239565 A1* | 9/2009 | Han | H04L 25/0224 455/512 |
| 2009/0274110 A1* | 11/2009 | Teo | H04B 7/061 370/329 |
| 2009/0286486 A1* | 11/2009 | Hong | H04B 7/061 455/69 |
| 2009/0310697 A1* | 12/2009 | Yu | H04B 7/0434 375/267 |
| 2010/0027696 A1* | 2/2010 | Lee, II | H04L 1/0026 375/260 |
| 2010/0246494 A1* | 9/2010 | Sanayei | H04B 7/0417 370/328 |
| 2010/0246496 A1* | 9/2010 | Yurugi | H04B 7/0851 370/328 |
| 2010/0246546 A1* | 9/2010 | Sung | H04B 7/0691 370/338 |
| 2010/0246638 A1* | 9/2010 | Mehta | H04B 1/713 375/133 |
| 2010/0316154 A1* | 12/2010 | Park | H04B 7/063 375/267 |
| 2010/0322109 A1* | 12/2010 | Ahn | H04L 5/0062 370/254 |
| 2011/0105049 A1* | 5/2011 | Yamada | H04B 7/0874 455/68 |
| 2012/0106613 A1* | 5/2012 | Piazza | H01Q 13/10 375/227 |
| 2012/0140848 A1* | 6/2012 | Lin | H04B 7/0413 375/296 |
| 2012/0178502 A1* | 7/2012 | Teo | H04B 7/061 455/562.1 |
| 2012/0263245 A1* | 10/2012 | Carbonelli | H04L 25/0232 375/260 |
| 2012/0275531 A1* | 11/2012 | Wu | H04B 7/0691 375/267 |
| 2012/0293360 A1* | 11/2012 | Hasegawa | G01S 13/34 342/146 |
| 2013/0102256 A1* | 4/2013 | Cendrillon | H04B 7/0854 455/63.4 |
| 2013/0156080 A1* | 6/2013 | Cheng | H01Q 1/243 375/222 |
| 2013/0208834 A1* | 8/2013 | Yamada | H04B 7/0697 375/340 |
| 2013/0237294 A1* | 9/2013 | Periyalwar | H04B 7/0689 455/575.7 |
| 2014/0029516 A1* | 1/2014 | Heo | H04W 72/0453 370/328 |

(56) References Cited

U.S. PATENT DOCUMENTS

| | | | |
|---|---|---|---|
| 2014/0219449 A1* | 8/2014 | Shattil | H04B 7/0456 380/270 |
| 2014/0269964 A1* | 9/2014 | Du | H04B 7/0452 375/267 |
| 2014/0355660 A1* | 12/2014 | Kameya | H04L 25/03114 375/232 |
| 2015/0010099 A1* | 1/2015 | Lin | H04B 7/0404 375/267 |
| 2015/0349870 A1* | 12/2015 | Chen | H04B 7/0822 375/347 |
| 2015/0381246 A1* | 12/2015 | Huang | H04B 7/0456 370/329 |
| 2016/0006549 A1* | 1/2016 | Kim | H04L 1/0026 370/252 |
| 2016/0028455 A1* | 1/2016 | Ma | H04B 7/0456 375/297 |
| 2016/0036508 A1* | 2/2016 | Szini | H04B 7/0814 375/227 |
| 2016/0103199 A1* | 4/2016 | Rappaport | G01S 3/48 342/377 |
| 2016/0119909 A1* | 4/2016 | Fukuzono | H04W 16/28 370/329 |
| 2016/0134015 A1* | 5/2016 | Sonoda | H01Q 1/1257 342/368 |
| 2016/0191215 A1* | 6/2016 | Lee | H04B 7/0626 375/260 |
| 2016/0248496 A1* | 8/2016 | Bellamkonda | H04B 7/0632 |
| 2017/0188379 A1* | 6/2017 | Shtrom | H04B 17/102 |
| 2018/0041265 A1* | 2/2018 | Su | H04B 17/336 |
| 2018/0077683 A1* | 3/2018 | Rico Alvarino | H04B 7/0404 |
| 2018/0131422 A1* | 5/2018 | Lee | H04B 7/0805 |
| 2018/0227036 A1* | 8/2018 | Palenius | H04B 17/21 |
| 2018/0337717 A1* | 11/2018 | Nasiri Khormuji | H04B 7/0673 |

* cited by examiner

SOUNDING REFERENCE SIGNAL (SRS) TRANSMIT ANTENNA SELECTION

CROSS-REFERENCE TO RELATED APPLICATION(S)

This application claims the benefit of U.S. Provisional Application Ser. No. 62/552,786, entitled "SOUNDING REFERENCE SIGNAL (SRS) TRANSMIT ANTENNA SELECTION" and filed on Aug. 31, 2017, which is expressly incorporated by reference herein in its entirety.

BACKGROUND

Aspects of the present disclosure relate generally to wireless communication networks, and more particularly, to sounding reference signal transmit (SRS) antenna selection for a user equipment having multiple antennas.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, in some wireless communication networks, signaling information may provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communications at a user equipment (UE) is provided. The UE may select, from a set of antennas, a subset of antennas for sounding reference signal (SRS) transmission based on at least one antenna selection parameter. The UE may further transmit, on an uplink communication channel, the SRS using the subset of antennas to a network entity.

In an aspect, an apparatus comprises a memory storing instructions and a processor in communication with the memory. The processor may be configured to execute the instructions to select, from a set of antennas, a subset of antennas for SRS transmission based on at least one antenna selection parameter. The processor may further be configured to transmit, on an uplink communication channel, the SRS using the subset of antennas to a network entity.

In an aspect, an apparatus for wireless communication is provided. The apparatus may include means for selecting, from a set of antennas, a subset of antennas for SRS transmission based on at least one antenna selection parameter. The apparatus may further include means for transmitting, on an uplink communication channel, the SRS using the subset of antennas to a network entity.

In an aspect, a computer-readable medium storing computer executable code for wireless communication comprises code for selecting, from a set of antennas, a subset of antennas for SRS transmission based on at least one antenna selection parameter, and transmitting, on an uplink communication channel, the SRS using the subset of antennas to a network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1A:
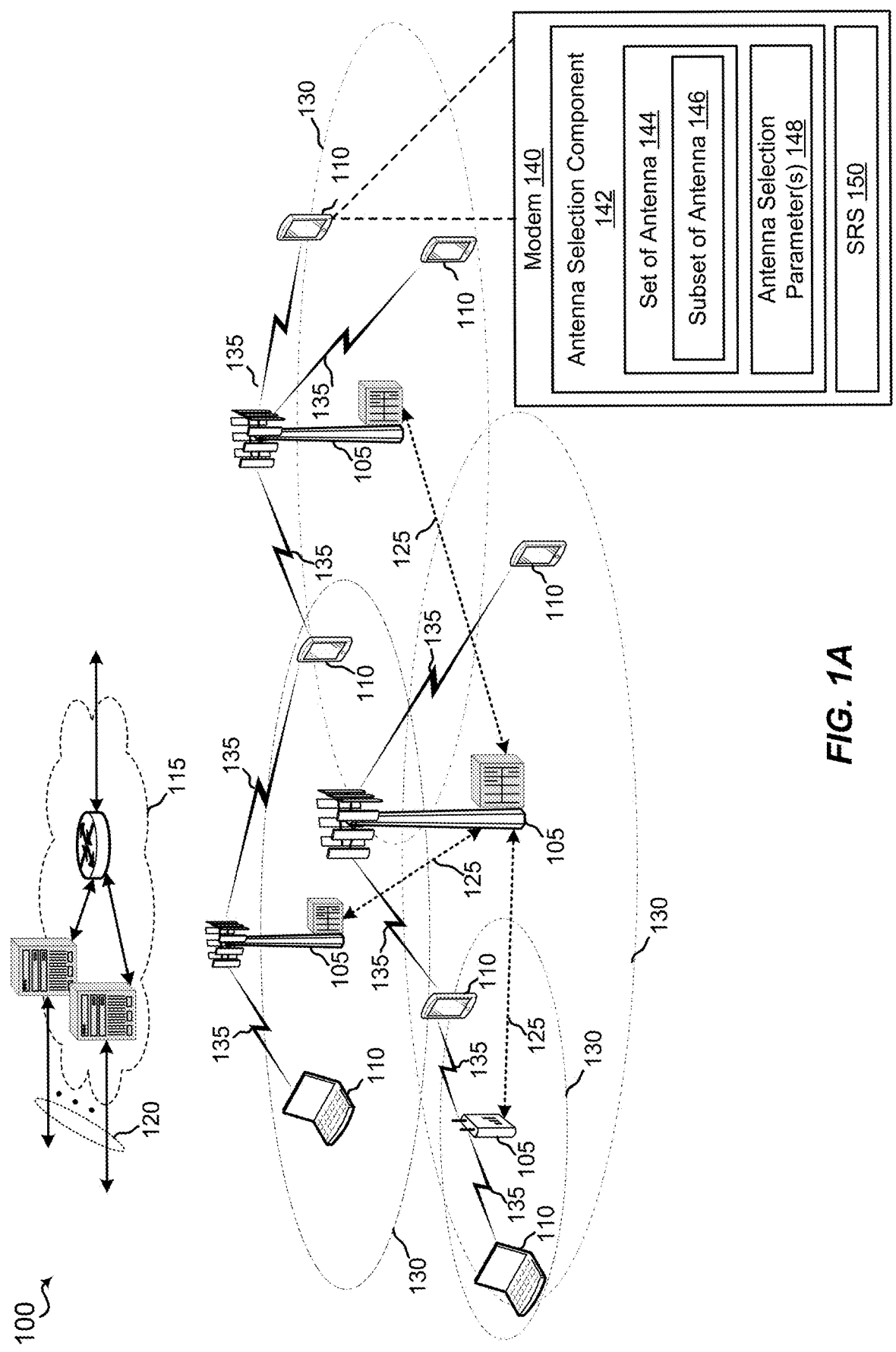
FIG. 1A is a schematic diagram of an example of a wireless communication network including at least one base station and at least one user equipment (UE) having an antenna selection component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to sounding reference signal transmit (SRS) antenna selection for a user equipment (UE) having multiple antennas. For example, some UEs may be equipped with multiple antennas (e.g., four antennas) either to support four layer MIMO, which has been deployed across many communication networks, or to provide the combining gain for two layer transmissions scheduled by the network. Transmit antenna selection for SRS transmissions on the uplink, however, may be limited to two antennas. Further, each of the multiple antennas may possess distinct receive conditions, with one or more antennas having higher achievable throughput than the other antennas. On the downlink, SRS may be used for downlink beamforming to maximize the throughput. Hence, it would be desirable to utilize a subset of the available antennas (e.g., 2 antennas) at the UE for SRS switching and transmission on the uplink such that the selection delivers a highest corresponding downlink throughput (e.g., from a network entity such as a base station).

As such, the present aspects provide an antenna selection scheme that delivers a highest potential downlink throughput. For example, in an aspect, a UE may select, from a set of antennas, a subset of antennas for SRS transmission based on at least one antenna selection parameter. The UE may further transmit, on an uplink communication channel, the SRS using the subset of antennas to a network entity. Additional features of the present aspects are described in more detail below with respect to FIGS. 1-3.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1A, in accordance with various aspects of the present disclosure, an example wireless communication network 100 may include at least one UE 110 in communication with a base station 105. The UE 110 may have modem 140, which may in turn include antenna selection component 142 for selecting a subset of antenna 146 from a set of antennas 144 for SRS 150 transmission and downlink beamforming.

As used herein, the term antenna should be understood to mean any logical entity or component for use in radiating or receiving radio waves, such as, for example, an antenna port or a physical antenna. Specifically, an antenna may be referred to as or otherwise correspond to an antenna port that may be a beam formed by one or more antennas or antenna elements. The one or more antenna elements may form an antenna port directed to a network entity (e.g., eNB or gNB). That is, the antenna port may be an array of antennas that form a beam pointing to a specific direction (e.g., transmit direction).

There may be two types of SRS configurations: cell-specific configurations and UE-specific configurations. In cell-specific configurations, a cell of the base station 105 may allow a transmission of the SRS 150 from one or more UEs including the UE 110 at various rates, up to SRS transmissions in every uplink subframe. Cell-specific SRS bandwidth may cover at least most of the uplink system bandwidth, excluding the PUCCH region. In UE-specific configurations, SRS transmission instances, within cell-specific SRS transmission instances, may transmit on a bandwidth as small as 4 resource blocks (RBs). The UE-specific configurations may use various techniques for transmitting a UE-specific SRS within the cell-specific SRS transmission, such as, cyclic shift, comb (e.g., 0 or 1), frequency starting position, hopping patterns, the number of antenna port(s) for transmission, and/or the like.

Transmission of the SRS 150 may be both periodic and aperiodic. Both periodic and aperiodic SRS may be transmitted by the UE 110 in UE-specific periodic SRS subframes, which may be a subset of cell-specific SRS subframes. Periodic SRS transmission provide a certain set of information to be transmitted by the UE 110 on a periodic basis. Once configured, the UE 110 may continue to transmit the SRS 150 until being de-configured or changed by some signal, such as an radio resource control (RRC) signal.

Aperiodic SRS may be triggered in a dynamic manner and may include additional information that is useful for base station analysis. Aperiodic SRS may be triggered in the UE 110 by a PDCCH configuration. PDCCH may trigger aperiodic SRS in PDCCH for uplink grants in format 0 (1-bit) and 4 (2-bit), and in PDCCH for downlink grants in format 1A/2B/2C. In total, five sets of SRS parameters may be configured by RRC. One set may correspond to downlink control information (DCI) format 0, one set for each of formats 1A/2B/2C, and three sets for DCI format 4 (as it contains a 2-bit A-SRS triggering field). Unlike periodic SRS, aperiodic SRS may occur once in response to a trigger.

Thus, the aperiodic SRS may not repeat unless the UE 110 receives repeated aperiodic SRS triggers.

The SRS 150 may be used for a variety of functions, including uplink link adaptation, downlink scheduling under channel reciprocity (e.g., for time division duplexing (TDD) systems), uplink power control, subband scheduling and timing tracking, as well as adaptive uplink antenna switching. On the downlink side, in addition to downlink scheduling, the SRS 150 may also be used in beamforming. For example, with multiple antennas supported in the UE 110, SRS antenna switching may be performed for uplink and/or downlink communication. SRS antenna switching generally serves two distinct purposes: uplink transmission diversity for PUSCH, which may be either open loop or closed loop, and TDD downlink MIMO beamforming based on channel reciprocity.

Specifically, the antenna selection component 142 may be configured to select a subset of antennas 146 (e.g., two antennas) from a set of antennas 144 (e.g., four antennas) based on one or more antenna selection parameters 148, which may correspond to a spectrum efficiency, a signal-to-noise ratio (SNR), an SNR and a channel correlation, and/or reference signal received power (RSRP). The selection of two antennas forming the subset of antennas 146 from the set of antennas 144 having four antennas is provided by way of example and illustration, and that both the set of antennas 144 corresponding to the total number of antennas at the UE 110 and the subset of antennas 146 corresponding to the antennas selected for at least SRS 150 transmission may be different (e.g., each of the set and/or subset may be smaller or larger).

In an aspect, a selection of the subset of antennas 146 may be based on spectrum efficiency. In particular, for TDD systems (e.g., duplex mode where SRS switching may be predominantly used), uplink and downlink channels may be reciprocal. That is, the uplink and downlink channels may use the same frequency and frequency band. The antenna selection component 142 may be configured to select the subset of antennas 146 (e.g., two antennas) yielding a highest spectrum efficiency together for SRS switching.

In particular, the antenna selection component 142 may determine a spectrum efficiency (e.g., in bits/sec per Hz) for subset of antennas 146. The antenna selection component 142 may then determine which subset from the set of antennas 144 forms the subset of antennas 146 having a highest aggregated spectrum efficiency. For instance, if the UE 110 has four antennas corresponding to the set of antennas 144, the antenna selection component 142 may determine which two of the four antennas have a highest aggregated spectrum efficiency. In some aspects, six antenna combination pairs may be available when employing four antennas. The UE 110 may transmit the SRS 150 on the subset of antennas 148 having the highest spectrum efficiency.

In an aspect, a selection of the subset of antennas 146 may be based on an SNR and channel correlation combination. For example, channel correlation may indicate whether spatial diversity exists in a communication environment. A lower channel correlation may support transmitting higher amounts of unique data. The antenna selection component 142 may be configured to utilize a single channel correlation matrix together with per antenna SNRs. In an example, if the UE 110 has four antennas corresponding to the set of antennas 144, the two antennas of good SNRs but low channel correlations as indicated by one or more values from a corresponding channel correlation matrix may be selected for SRS switching/transmission.

Specifically, the antenna selection component 142 may be configured to determine an SNR value for each antenna and a channel correlation value for each subset of antennas 146. The antenna selection component 142 may select the subset of antennas 146 each having lowest channel correlation values and highest SNR values. In some aspects, the antenna selection component 142 may select the subset of antennas 146 based on first selecting the antenna of the highest SNR and then selecting a second antennas of the least correlation with the first selected antenna.

In an aspect, a selection of the subset of antennas 146 may be based on SNRs. This approach may assume the channel correlations between any two antennas are comparable. The antenna selection component 142 may be configured to determine an SNR value for each antenna from the set of antennas 144 and select the subset of antennas 146 having a highest SNR. In an example where the set of antennas 144 includes four antennas, the antenna selection component 142 may select the two antennas having a highest and second highest SNR for SRS transmission.

In an aspect, a selection of the subset of antennas 146 may be based on RSRP values. For example, basing the antenna selection on RSRP values may indicate the path loss as the proxy for downlink receive quality. Specifically, the antenna selection component 142 may be configured to determine an RSRP value for each antenna from the set of antennas 144 and select the subset of antennas 146 having a highest RSRP. In an example where the set of antennas 144 includes four antennas, the antenna selection component 142 may select the two antennas having a highest and second highest RSRP for SRS transmission. In some aspects, a highest RSRP may also be used for physical uplink shared channel (PUSCH) and/or physical uplink control channel (PUCCH) transmissions.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a 4G and/or LTE technology. Also, the one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 1B:
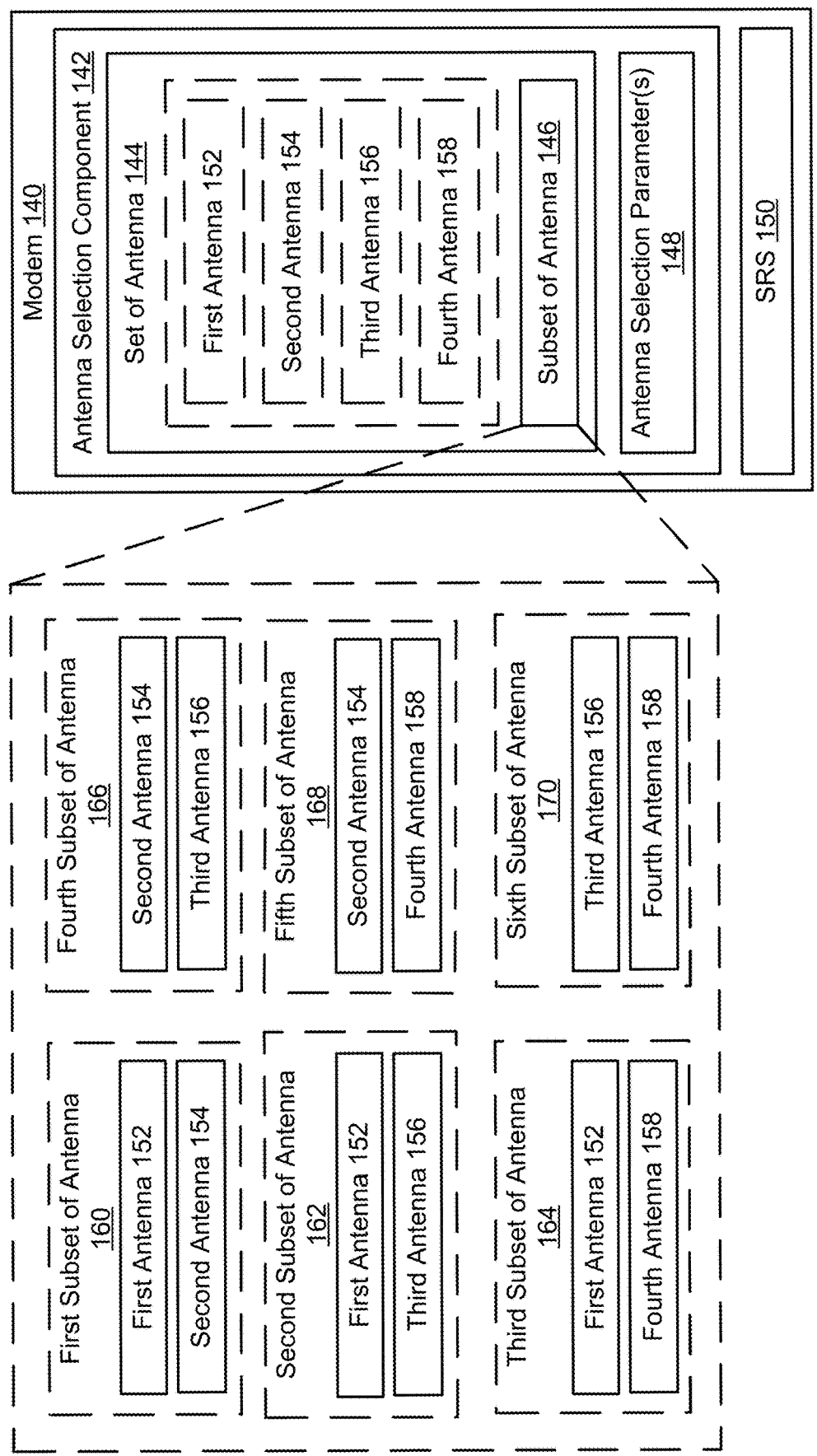
FIG. 1B is a schematic diagram of example subsets of antennas in accordance with various aspects of the present disclosure.

Referring to FIG. 1B, a schematic diagram of a potential number subset of antennas 146 when the set of antennas 144 includes four antennas. Specifically, the set of antennas 144, which may correspond to a total number of antennas at the UE 110, may include a first antenna 152, a second antenna 154, a third antenna 156, and a fourth antenna 158. In an aspect, the antenna selection component 142 may select any two distinct antennas from the set of antennas 144 for SRS 150 transmission. That is, the antenna selection component 142 may select as the subset of antennas 146, one of the first subset of antennas 160, the second subset of antennas 162, the third subset of antennas 164, the fourth subset of antennas 166, the fifth subset of antennas 168, or the sixth subset of antennas 170.

For example, based on the one or more of the antenna selection parameters 148, the antenna selection component 142 may select, switch to, or otherwise form the first subset of antennas 160 including the first antenna 152 and the second antenna 154, the second subset of antennas 162 including the first antenna 152 and the third antenna 156, the third subset of antennas 162 including the first antenna and the fourth antenna 158, the fourth subset of antennas 166 including the second antenna 154 and the third antenna 156, the fifth subset of antennas 168 including the second antenna 154 and the fourth antenna 158, or the sixth subset of antennas 170 including the third antenna 156 and the fourth antenna 158.

Figure 2:
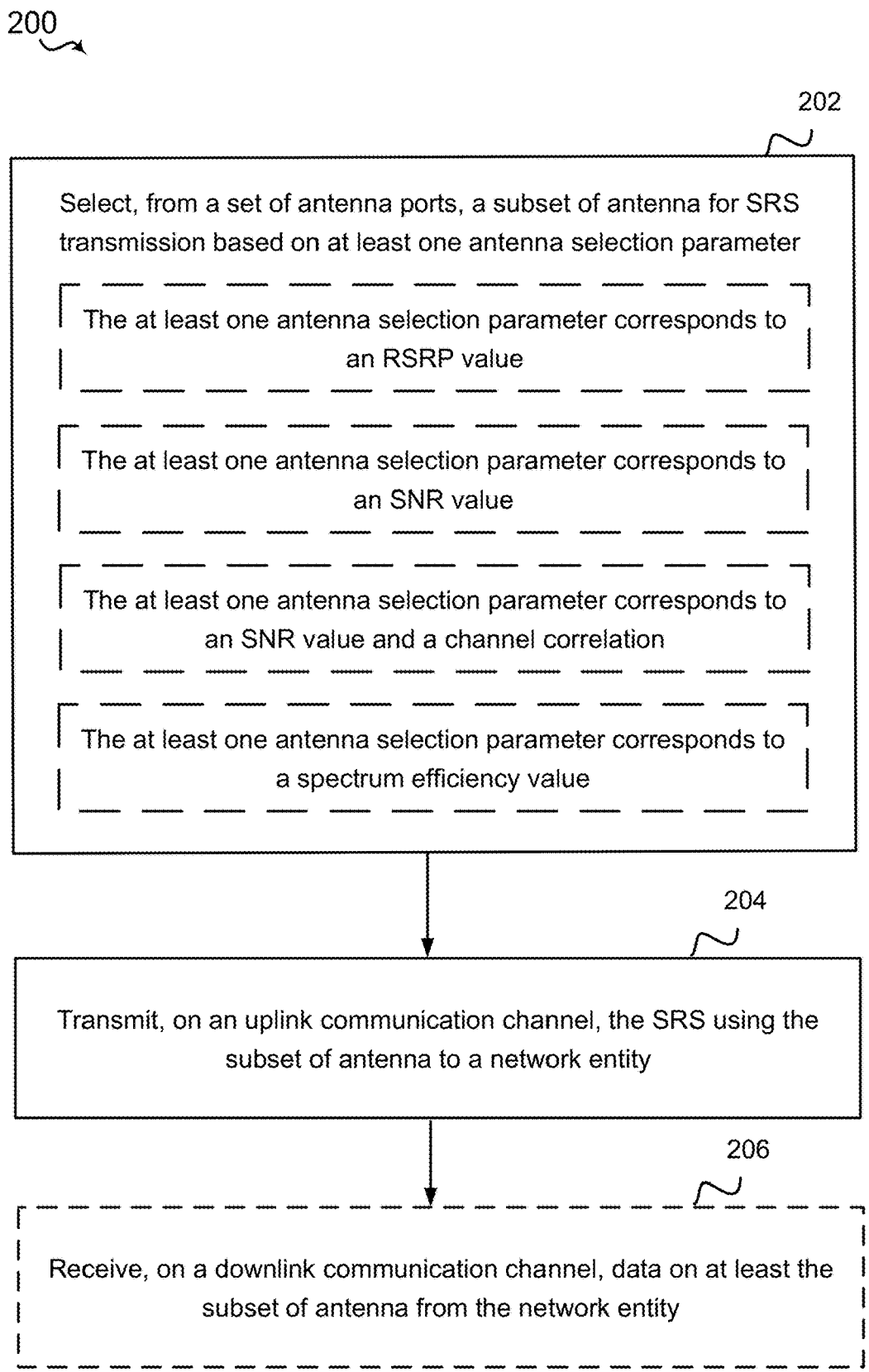
FIG. 2 is a flow diagram of an example of a method of wireless communication at a UE.

Referring to FIG. 2, for example, a method 200 of wireless communication in operating UE 110 including the antenna selection component 142 according to the above-described aspects according to one or more of the herein-defined actions. The one or more processors 312 may, in conjunction with the antenna selection component 142 may perform the one or more of the herein-defined actions.

At block 202, the method 200 may select, from a set of antennas, a subset of antennas for SRS transmission based on at least one antenna selection parameter. For example, in an aspect, the UE 110 may execute the antenna selection component 142 to select, from a set of antennas 144, a subset of antennas 146 for SRS 150 transmission based on at least one antenna selection parameter 148.

In some aspects, the set of antennas 144 may include at least four antennas and the subset of antennas 146 may include at least two antennas.

In some aspects, the at least one antenna selection parameter 148 may correspond to an RSRP value. In some aspects, selecting the subset of antennas 146 for SRS 158 transmission may include determining an RSRP value for each antenna from the set of antennas 144, and selecting at least two antennas each having a highest RSRP value to form the subset of antennas 146.

In some aspects, the at least one antenna selection parameter 148 may correspond to an SNR value. In some aspects, selecting the subset of antennas 146 for SRS 158 transmission may include determining an SNR value for each antenna from the set of antennas 144, and selecting at least two antennas each having a highest RSRP value to form the subset of antennas 146.

In some aspects, the at least one antenna selection parameter 148 may correspond to an SNR value and a channel correlation metric. In some aspects, selecting the subset of antennas 146 for SRS 158 transmission may include determining an SNR value for each antenna from the set of antennas 144, determining a channel correlation value for each antenna from the set of antennas 144, and selecting at least two antennas based on the SNR value and channel correlation value for each antenna from the set of antennas 144.

In some aspects, selecting the at least two antennas based on the SNR value for each antenna from the set of antennas 144 and the channel correlation value for each pair of antennas from the set of antennas 144 may include selecting a first antenna having a highest SNR value, and selecting a second antenna having a lowest correlation value with the first antenna to from the subset of antennas.

In some aspects, the at least one antenna selection parameter 148 may correspond to a spectrum efficiency value. In some aspects, selecting the subset of antennas 146 for SRS 158 transmission includes determining an aggregated spectrum efficiency value for each pair of antennas from the set of antennas 144, and selecting the two antennas having a highest aggregated spectrum efficiency value to form the subset of antennas 146.

At block 204, the method 200 may transmit, on an uplink communication channel, the SRS using the subset of antennas to a network entity. For example, in an aspect, the UE 110 may execute the transceiver 388 and/or the RF front end 388 to transmit, on an uplink communication channel, the SRS 150 using the subset of antennas 146 to a network entity (e.g., base station 105).

At block 206, the method 200 may receive, on a downlink communication channel, data on at least the subset of antennas from the network entity. For example, in an aspect, the UE 110 may execute the transceiver 388 and/or the RF front end 388 to receiving, on a downlink communication channel, data on the subset of antennas 146 from the network entity (e.g., base station 105). In some aspects, a frequency of the uplink communication channel may be the same as a frequency of the downlink communication channel. In some aspects, the UE 110 may receive data on the downlink communication channel on or via the set of antennas 144 irrespective of the selection of the subset of antennas 146 for SRS 150 transmission on the uplink.

Figure 3:
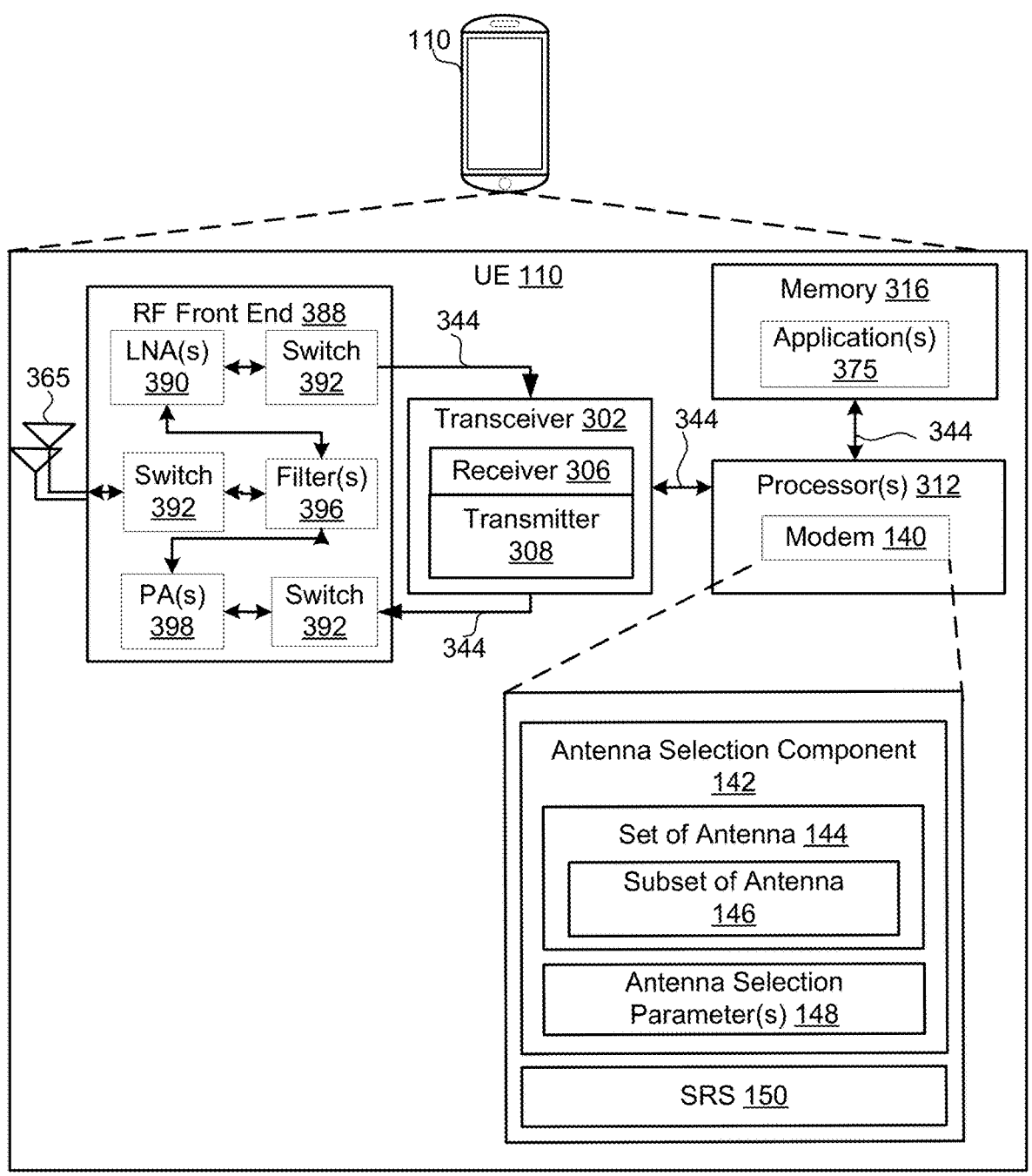
FIG. 3 is a schematic diagram of example components of the UE of FIG. 1.

Referring to FIG. 3, one example of an implementation of UE 110 may include a variety of components, some of which have already been described above, but including components such as one or more processors 312 and memory 316 and transceiver 302 in communication via one or more buses 344, which may operate in conjunction with modem 140 and antenna selection component 142 as described herein. Further, the one or more processors 312, modem 140, memory 316, transceiver 302, radio frequency (RF) front end 388 and one or more antennas 365, may be configured to support voice and/or data calls (simultaneously or non-simultaneously) in one or more radio access technologies. In some aspects, the one or more antennas 365 may correspond to the set of antennas 144, which may include the first antenna 152, second antenna 154, third antenna 156, and fourth antenna 158.

In an aspect, the one or more processors 312 can include a modem 140 that uses one or more modem processors. The various functions related to antenna selection component 142 may be included in modem 140 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 140 associated with antenna selection component 142 may be performed by transceiver 302.

Also, memory 316 may be configured to store data used herein and/or local versions of applications 375 or antenna selection component 142 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining antenna selection component 142 and/or one or more of its subcomponents, and/or data associated therewith, when UE 110 is operating at least one processor 312 to execute antenna selection component 142 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a RF receiver. In an aspect, receiver 306 may receive signals transmitted by at least one base station 105. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may include, but is not limited to, an RF transmitter.

Moreover, in an aspect, UE 110 may include RF front end 388, which may operate in communication with one or more antennas 365 and transceiver 302 for receiving and transmitting radio transmissions, for example, wireless communications transmitted by at least one base station 125 or wireless transmissions transmitted by UE 110. RF front end 388 may be connected to one or more antennas 365 and can include one or more low-noise amplifiers (LNAs) 390, one or more switches 392, one or more power amplifiers (PAs) 598, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 598 may be used by RF front end 388 to amplify a signal for an RF output at a desired output power level. In an aspect, each PA 598 may have specified minimum and maximum gain values. In an aspect, RF front end 388 may use one or more switches 392 to select a particular PA 598 and a corresponding specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 598 to produce an output signal for transmission. In an aspect, each filter 396 can be connected to a specific LNA 390 and/or PA 598. In an aspect, RF front end 388 can use one or more switches 392 to select a transmit or receive path using a specified filter 396, LNA 390, and/or PA 598, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 302 to operate at a specified frequency and power level based on the UE configuration of the UE 110 and the communication protocol used by modem 140.

In an aspect, modem 140 can be a multiband-multimode modem, which can process digital data and communicate with transceiver 302 such that the digital data is sent and received using transceiver 302. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of communication at a user equipment (UE), comprising:
   selecting, from a set of antennas, a subset of antennas for sounding reference signal (SRS) transmission based on at least one antenna selection parameter such that the subset of antennas delivers a highest corresponding downlink throughput, wherein the at least one antenna selection parameter corresponds to a signal-to-noise ratio (SNR) value and a channel correlation value indicating a degree of spatial diversity for the set of antennas, and wherein selecting the subset of antennas for SRS transmission includes:
      determining SNR value for each antenna from the set of antennas;
      determining the channel correlation value for each pair of antennas from the set of antennas as indicated in a corresponding channel correlation matrix; and
      selecting at least two antennas based on the SNR value for each antenna from the set of antennas and the channel correlation value for each pair of antennas from the set of antennas, herein selecting the at least two antennas based on the SNR value for each antenna from the set of antennas and the channel correlation value for each pair of antennas from the set of antennas includes:
   selecting a first antenna having a highest SNR value; and
   selecting a second antenna having a lowest correlation value with the first antenna to form the subset of antennas; and
transmitting, on an uplink communication channel, the SRS using the subset of antennas to a network entity.

2. The method of claim 1, wherein the at least one antenna selection parameter further corresponds to a reference signal received power (RSRP) value.

3. The method of claim 2, wherein selecting the subset of antennas for SRS transmission includes:
   determining the RSRP value for each antenna from the set of antennas; and
   selecting at least two antennas having highest RSRP values to form the subset of antennas.

4. The method of claim 1, wherein selecting the subset of antennas for SRS transmission includes:
   determining the SNR value for each antenna from the set of antennas; and
   selecting at least two antennas having highest SNR values to form the subset of antennas.

5. The method of claim 1, wherein the at least one antenna selection parameter further corresponds to a spectrum efficiency value.

6. The method of claim 5, wherein selecting the subset of antennas for SRS transmission includes:
   determining an aggregated spectrum efficiency value for each pair of antennas from the set of antennas;
   selecting at least two antennas having highest aggregated spectrum efficiency values to form the subset of antennas.

7. The method of claim 1, further comprising receiving, on a downlink communication channel, data on at least the subset of antennas from the network entity.

8. The method of claim 1, wherein the SRS is transmitted on the uplink communication channel according to a time division duplex (TDD) mode.

9. The method of claim 1, wherein the set of antennas includes at least four antennas and the subset of antennas includes at least two antennas.

10. An apparatus, comprising:
a memory; and
a processor in communication with the memory, wherein the processor is configured to:
   select, from a set of antennas, a subset of antennas for sounding reference signal (SRS) transmission based on at least one antenna selection parameter such that the subset of antennas delivers a highest corresponding downlink throughput, wherein the at least one antenna selection parameter corresponds to a signal-to-noise ratio (SNR) value and a channel correlation value indicating a degree of spatial diversity for the set of antennas, and wherein to select the subset of antennas for SRS transmission, the processor is further configured to:
      determine the SNR value for each antenna from the set of antennas;
      determine the channel correlation value for each pair of antennas from the set of antennas as indicated in a corresponding channel correlation matrix; and
      select at least two antennas based on the SNR value for each antenna from the set of antennas and the channel correlation value for each pair of antennas from the set of antennas, wherein to select the at least two antennas based on the SNR value for each antenna from the set of antennas and the channel correlation value for each pair of antennas from the set of antennas, the processor is further configured to:
         select a first antenna having a highest SNR value; and
         select a second antenna having a lowest correlation value with the first antenna to form the subset of antennas; and
   transmit, on an uplink communication channel, the SRS using the subset of antennas to a network entity.

11. The apparatus of claim 10, wherein the at least one antenna selection parameter further corresponds to a reference signal received power (RSRP) value.

12. The apparatus of claim 11, wherein to select the subset of antennas for SRS transmission, the processor is further configured to:
   determine the RSRP value for each antenna from the set of antennas; and
   select at least two antennas having highest RSRP values to form the subset of antennas.

13. The apparatus of claim 10, wherein to select the subset of antennas for SRS transmission, the processor is further configured to:
   determine the SNR value for each antenna from the set of antennas; and
   select at least two antennas having highest SNR values to form the subset of antennas.

14. The apparatus of claim 10, wherein the at least one antenna selection parameter further corresponds to a spectrum efficiency value.

15. The apparatus of claim 14, wherein to select the subset of antennas for SRS transmission, the processor is further configured to:
   determine an aggregated spectrum efficiency value for each pair of antennas from the set of antennas;
   select at least two antennas having highest aggregated spectrum efficiency values to form the subset of antennas.

16. The apparatus of claim 10, wherein the processor is further configured to receive, on a downlink communication channel, data on at least the subset of antennas from the network entity.

17. The apparatus of claim 10, wherein the SRS is transmitted on the uplink communication channel according to a time division duplex (TDD) mode.

18. The apparatus of claim 10, wherein the set of antennas includes at least four antennas and the subset of antennas includes at least two antennas.

19. An apparatus for wireless communication, comprising:
   means for selecting, from a set of antennas, a subset of antennas for sounding reference signal (SRS) transmission based on at least one antenna selection parameter such that the selecting delivers a highest corresponding downlink throughput, wherein the at least one antenna selection parameter corresponds to a signal-to-noise ratio (SNR) value and a channel correlation value indicating a degree of spatial diversity for the set of antennas, and wherein the means for selecting the subset of antennas for SRS transmission includes:
      means for determining SNR value for each antenna from the set of antennas;

means for determining the channel correlation value for each pair of antennas from the set of antennas as indicated in a corresponding channel correlation matrix; and means for selecting at least two antennas based on the SNR value for each antenna from the set of antennas and the channel correlation value for each pair of antennas from the set of antennas, wherein the means for selecting the at least two antennas based on the SNR value for each antenna from the set of antennas and the channel correlation value for each pair of antennas from the set of antennas includes:

means for selecting a first antenna having a highest SNR value; and means for selecting a second antenna having a lowest correlation value with the first antenna to form the subset of antennas; and means for transmitting, on an uplink communication channel, the SRS using the subset of antennas to a network entity.

20. The apparatus of claim 19, wherein the at least one antenna selection parameter further corresponds to a spectrum efficiency value.

21. A non-transitory computer-readable medium storing computer executable code for wireless communication, comprising code for:

selecting, from a set of antennas, a subset of antennas for sounding reference signal (SRS) transmission based on at least one antenna selection parameter such that the selecting delivers a highest corresponding downlink throughput, wherein the at least one antenna selection parameter corresponds to a signal-to-noise ratio (SNR) value and a channel correlation value indicating a degree of spatial diversity for the set of antennas, and wherein selecting the subset of antennas for SRS transmission includes:

determining SNR value for each antenna from the set of antennas;

determining the channel correlation value for each pair of antennas from the set of antennas as indicated in a corresponding channel correlation matrix; and selecting at least two antennas based on the SNR value for each antenna from the set of antennas and the channel correlation value for each pair of antennas from the set of antennas, wherein selecting the at least two antennas based on the SNR value for each antenna from the set of antennas and the channel correlation value for each pair of antennas from the set of antennas includes:

selecting a first antenna having a highest SNR value; and selecting a second antenna having a lowest correlation value with the first antenna to form the subset of antennas; and transmitting, on an uplink communication channel, the SRS using the subset of antennas to a network entity.

22. The non-transitory computer-readable medium of claim 21, wherein the at least one antenna selection parameter further corresponds to a spectrum efficiency value.

* * * * *